United States Patent [19]

Takiyama et al.

[11] Patent Number: 4,814,365

[45] Date of Patent: Mar. 21, 1989

[54] CURABLE RESIN COMPOSITION

[75] Inventors: Eiichiro Takiyama, Kamakura; Akira Yokoyama, Yokohama; Ryushi Ogura, Takasaki, all of Japan

[73] Assignee: Showa High Polymer Co., Ltd., Tokyo, Japan

[21] Appl. No.: 65,846

[22] Filed: Jun. 24, 1987

[51] Int. Cl.$^4$ .............................................. C08L 67/06
[52] U.S. Cl. ................................... 523/514; 523/521; 523/527; 525/109; 525/111; 525/132; 525/149; 525/169; 525/170
[58] Field of Search ............... 525/109, 132, 149, 111, 525/169, 170; 523/514, 521, 527

[56] References Cited

FOREIGN PATENT DOCUMENTS 59-230019 12/1984 Japan .
60-038403  2/1985 Japan .
61-258817 11/1986 Japan .

Primary Examiner—Patricia Short
Attorney, Agent, or Firm—Oblon, Fisher, Spivak, McClelland & Maier

[57] ABSTRACT

A curable resin composition is disclosed which comprises (A) a polymer having a (meth)acryloyl group in a side chain, (B) an unsaturated alkyd which is formed by the esterification of a polyvalent alcohol component and an α-βunsaturated polybasic acid or an anhydride thereof with or without a polybasic acid, the polyvalent alcohol component comprising a phenol-modified epoxy resin which is obtained by the reaction of an epoxy group of an epoxy resin and a phenolic hydroxyl group of a phenol, or the reaction product of a polyvalent phenol compound and a monoepoxide, (C) a polymerizable monomer, and (D) a curing agent. It is suitable for underwater linings, putties, sealing materials, and the like.

8 Claims, No Drawings

CURABLE RESIN COMPOSITION

BACKGROUND OF THE INVENTION

This invention relates to a curable resin composition for use as a coating material or bonding agent which has excellent adhesion properties when applied to a surface which is moist or wet with water. In particular, it relates to a curable resin composition for use as a lining, a putty, a sealing material or the like which can be easily applied to large underwater surfaces.

At present, resins which are used for linings, putties, sealing materials, and the like include epoxy resins, vinyl ester resins, and polyurethane resins. All are widely utilized in various fields in accordance with their characteristic strengths.

However, when these presently-existing resins are applied to a wet surface, such as a concrete surface, or if the surface is immersed in sea water immediately after application, the resulting coating does not have adequate adhesion properties, and accordingly there is presently a need for an improvement in the properties of such resins.

There are a number of well-known resins which can cure in water, such as an epoxy resin which uses as a curing agent a polyamide resin which is obtained by condensation of xylenediamine and a dimer acid. However, there is significant variation in the adhesiveness of this resin in water, and thus it is lacking in reliability. Furthermore, as it must cure quickly, it has a pot life of only 20–30 minutes, and is therefore not suitable for coating of large surfaces. Various kinds of underwater coating materials are also described in "Materials Protection and Performance", Vol. 10, No. 4 (1971), but these materials are not completely satisfactory in regards to their utility.

When applying a protective lining to an iron or steel structure on site, it is frequently difficult to completely remove all of the rust from the structure before application. Therefore, it is common to remove only the loose rust before application of the lining, and under these adverse conditions, the lining needs to have not only adequate adhesion properties but also rust-preventing properties.

One conventional method of applying a resin coating is to use a mixture of a synthetic resin emulsion and cement. However, a coating applied by this method requires a long time to cure, and if water contacts the coated film prior to curing, or if the coating is in a high-temperature environment, the coated film runs or takes an extremely long time to cure. Furthermore, while a resin coating can be applied by this method to a porous surface such as a concrete surface which is able to absorb a certain amount of water, when it is applied to a surface which has absolutely no water absorption properties such as a metal surface, curing is delayed, and the adhesion properties may be inadequate. Also, depending on the thickness of the coated film, hair cracks develop, in which case the coated film is unable to serve its intended purpose.

SUMMARY OF THE INVENTION

Accordingly, it is an object of the present invention to provide a curable resin composition which can be used as a coating material or bonding agent which has excellent adhesion properties when applied to a surface which is moist or wet with water, and particularly a curable resin composition for use as a lining, a putty, a sealing material, or the like which can be easily applied to large underwater surfaces.

Namely, the present invention is a curable resin composition which comprises (A) a polymer having a (meth)acryloyl group in a side chain, (B) an unsaturated alkyd which is obtained by the esterification of a polyvalent alcohol component with an $\alpha$-$\beta$ unsaturated polybasic acid or its anhydride, with or without another polybasic acid, the polyvalent alcohol component comprising a phenol-modified epoxy resin which is obtained by the reaction of an epoxy group of an epoxy resin and a phenolic hydroxyl group of a phenol, or the reaction product of a polyvalent phenol compound and a monoepoxide, (C) a polymerizable monomer, and (D) a curing agent.

As a curable composition in accordance with the present invention comprises the above components, it has excellent adhesion properties even when it is applied to a surface which is moist or wet with water, it has excellent resistance to water and chemicals, and it is suitable for coating large underwater surfaces.

DESCRIPTION OF THE PREFERRED EMBODIMENTS

The above-listed components of the present invention will now be described in detail.

COMPONENT A

This component is a polymer having a (meth)acryloyl group in a side chain. This component is not limited to a single compound, and it can be synthesized using a variety of different methods, but generally, it is synthesized in the following manner.

A copolymer (a) is obtained by copolymerization of a polymerizable monomer (i) having a carbon-carbon double bond and a polymerizable monomer (ii) having a double bond which can bond with monomer (i) and also having a (meth)acryloyl group-receptive functional group (such as an acid anhydride group, a carboxyl group, a hydroxyl group, or an epoxy group). The copolymer (a) is subjected to urethanation or esterification with a compound (b) having a group (such as a hydroxyl group, an epoxy group, or an isocyanate group) which can react with the (meth)acryloyl group-receptive functional group which is derived from monomer (ii) and also having a (meth)acryloyl group.

Monomer (i) which forms the main chain of the copolymer (a), can be any polymerizable monomer which has a carbon-carbon double bond. Some examples of a monomer which can be used are styrene, vinyltoluene, chlorostyrene, acrylates, methacrylates, acrylonitrile, vinyl chloride, vinylidene chloride, vinylpyrrolidone, and vinyl acetate. These and similar substances can be used alone or in combination.

Monomer (ii) having a (meth)acryloyl group-receptive functional group is a polymerizable monomer having a functional group such as an acid anhydride group, a carboxyl group, a hydroxyl group, or an epoxy group which can undergo urethanation or esterification with the reactive group of the above-mentioned compound (b). Some examples of a polymerizable monomer having an acid anhydride group are maleic anhydride and itaconic anhydride. Examples of a polymerizable monomer having a carboxyl group are acrylic acid and methacrylic acid. Polymerizable monomers with a hydroxyl group include unsaturated monoalcohols such as 2-hydroxyethyl acrylate, 2-hydroxypropyl acrylate, 2-hydroxyethyl methacrylate, 2-hydroxypropyl methacrylate, and methylolacrylamide. Polymerizable monomers having an epoxy group include glycidyl (meth)acrylate and mono(meth)acrylates of epoxy resins.

Compound (b) which introduces (meth)acryloyl group into a side chain of copolymer (a) is a compound having a reactive group such as a hydroxyl group, an epoxy group, or an isocyanate group which can cause a urethanation or esterification reaction with the functional group which is derived from monomer (ii) of copolymer (a), and which also has a (meth)acryloyl group. The material which is employed as compound (b) varies depending on the type of functional group within copolymer (a). Examples of substances which can be used as compound (b) when it undergoes esterification with an acid anhydride group in copolymer (a) to introduce a (meth)acryloyl group in a side chain are unsaturated monoalcohols such as 2-hydroxyethyl acrylate. Examples of substances which can be used as compound (b) when it undergoes esterification with a carboxyl group in a side chain of copolymer (a) to introduce a (meth)acryloyl group are unsaturated monoepoxy compounds such as glycidyl (meth)acrylate, particularly glycidyl methacrylate, and mono(meth)acrylates of epoxy resins. Examples of substances which can be used as compound (b) when it undergoes urethanation with a hydroxyl group in a side chain of copolymer (a) are isocyanatoethyl methacrylate and unsaturated isocyanates which are obtained by the reaction of the above-mentioned unsaturated monoalcohols such as 2-hydroxyethyl acrylate and a polyvalent isocyanate. Examples of substances which can be used as compound (b) when it undergoes esterification with an epoxy group in a side chain of copolymer (a) are acrylic acid and methacrylic acid.

Ideally, the unsaturated isocyanate which has a (meth)acryloyl group has one (meth)acryloyl group and one isocyanate group in each molecule. However, in order to prevent gelation during reaction, it is necessary to react at least one mole of the unsaturated monoalcohol with each mole of the polyvalent isocyanate and to make the residual ratio of isocyanate groups in the unsaturated isocyanate 0.2–0.9 (molar ratio). For example, it is necessary to react from 1.1 to 1.8 moles of an unsaturated alcohol with each mole of diisocyanate so that there will be residual isocyanate groups. The residual isocyanate groups are used for reaction with hydroxyl groups in the main chain of copolymer (a) which is obtained from monomer (i) and monomer (ii).

In this manner, there are various types of polymers having a (meth)acryloyl group in a side chain which can be used as Component (A). A typical example of these polymers is a branch-unsaturated polymer having a (meth)acryloyl group in a side chain connected through a urethane bond or an ester bond and whose main chain is a carbon-carbon bond.

Next, specific examples of Component (A) and manufacturing methods therefor will be described.

(1) A branch-unsaturated polymer having a side chain containing a (meth)acryloyl group connected through a urethane bond (1.1) One such substance is described in Japanese Patent Application Laid-Open Nos. 59-230019 and 60-38403. A curable branch-unsaturated polymer (A) is obtained by the reaction of the hydroxyl group of a copolymer (a) having a hydroxyl group in a side chain, and an isocyanate group of an unsaturated isocyanate (b) which has a free isocyanate group and which is an adduct of polyvalent isocyanate and an unsaturated monoalcohol having a (meth)acryloyl group. Among such branch-unsaturated polymers (A), one having the following structural formula is suitable for use in the present invention.

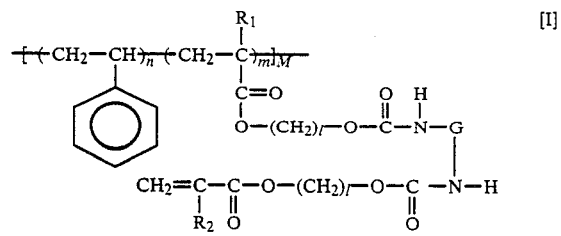

wherein R1 and R2 are hydrogen or methyl groups, G indicates the residue of diisocyanate, M is 50–300, n is 70–99, m is 1–30, and l is 2 or 3.

Most suitably, a copolymer of 2-hydroxyethyl (meth)acrylate or 2-hydroxypropryl (meth)acrylate and styrene is used as copolymer (a) having a hydroxyl group in a side chain, and an adduct having a 1:1 molar ratio of tolylene diisocyanate and 2-hydroxyethyl (meth)acrylate or 2-hydroxypropyl (meth)acrylate is used as an unsaturated isocyanate (b) and is reacted with the copolymer (a).

(1.2) Another such curable branch-unsaturated polymer (A) is obtained by reacting the above-described copolymer (a) having a hydroxyl group in a side chain with isocyanate ethyl methacrylate (b).

(1.3) Another such branch-unsaturated polymer (A) is obtained by reacting a copolymer (a) which is obtained by copolymerization of isocyanate ethyl methacrylate and a vinyl monomer such as styrene or methyl methacrylate, and which has an isocyanate group in a side chain, with an unsaturated alcohol (b) which has a (meth)acryloyl group.

(2) A branch-unsaturated polymer which has a side chain containing a (meth)acryloyl group connected through an ester bond (2.1) A typical example is a branch-unsaturated polymer (A) which is obtained by reacting a copolymer (a) which contains a glycidyl group in a side chain and (meth)acrylic acid (b) and which is expressed by the following structural formula:

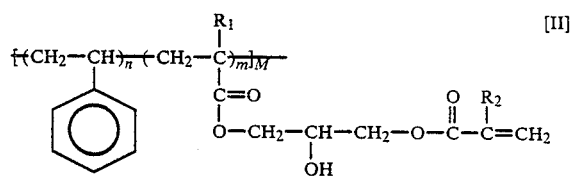

wherein R1, R2, M, n, and m are the same as in Formula I.

A suitable example is a substance which is obtained by the esterification reaction of a copolymer of styrene and glycidyl (meth)acrylate with (meth)acrylic acid. It is also suitable to employ allyl glycidyl ether in place of a portion of the glycidyl (meth)acrylate.

(2.2) Another such polymer is one which is expressed by Formula II and which is obtained by reaction of a copolymer (a) having a carboxyl group in a side chain and an unsaturated epoxy compound. A suitable example is a substance obtained by the reaction of a copolymer of styrene and (meth)acrylic acid with glycidyl (meth)acrylate.

(2.3) Another such polymer is one which is obtained by the method disclosed in Japanese Patent Application Laid-Open No. 61-258817. That method comprises the following two processes:

Process A: A component which contains an unsaturated epoxy resin including a (meth)acryloyl group and an epoxy group in each molecule is obtained by reacting an epoxy resin with (meth)acrylic acid, using at least one mole of the epoxy resin for each mole of the (meth)acrylic acid. This component is then copolymerized with a vinyl monomer using a radical polymerization catalyst to form a copolymer (a) having an epoxy resin in a side chain.

Process B: After Process A, (meth)acrylic acid (b) is added to the reaction mixture obtained in Process A in an amount such that the number of moles of (meth)acrylic acid is substantially equal to the number of moles of residual epoxy groups, and the epoxy groups and carboxyl groups are reacted to obtain a branch-unsaturated polymer (A).

As polymer (A), substance whose structure is expressed by the following structural formula is suitable.

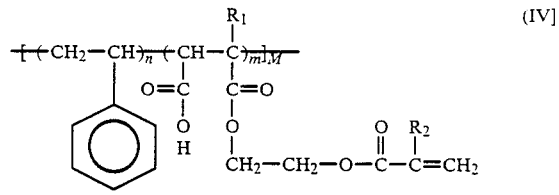

wherein R1, R2, n, m, and M are the same as in Formula I.

A particularly suitable substance is one which is obtained by reacting a copolymer of styrene and maleic acid (which is used as a polymer having an acid anhydride group) with 2-hydroxyethyl (meth)acrylate or 2-hydroxypropyl (meth)acrylate.

Furthermore, a polymer without free carboxyl groups which is obtained by reacting the free carboxyl groups (which are formed as a result of esterification) with a monomer having an epoxy group and a (meth)acryloyl group or a hydroxyl group and a (meth)acryloyl group can be used in the present invention.

A conventional catalyst can be used in the copolymerization reaction, the urethanation reaction, and the esterification reaction for the synthesis of polymer (A).

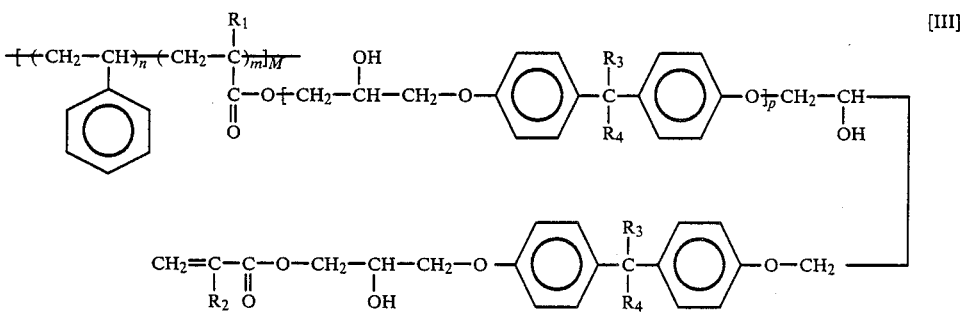

wherein R1, R2, M, n, and m are the same as in Formula I, R3, and R4 are hydrogen or methyl groups, and p is an integer from 0 to 5.

A novolak-type epoxy resin or a cycloaliphatic epoxy resin can be used in place of the bisphenol-type epoxy resin.

(2.4) Another such branch-unsaturated polymer is one which has the structure illustrated by Formula III and which is obtained by the reaction of a copolymer (a) obtained by copolymerization of a vinyl monomer and (meth)acrylate and containing a carboxyl group in a side chain and the above-described unsaturated epoxy resin (b), which is obtained by reacting an epoxy resin with (meth)acrylic acid and which has an epoxy group and a (meth)acryloyl group in each molecule.

The epoxy resin which can be employed is the same as that described above.

(2.5) Another such branch-unsaturated polymer (A) is one which is obtained by reacting a copolymer (a) having an acid anhydride group in a side chain with an unsaturated alcohol (b) having a (meth)acryloyl group. A suitable polymer is one having the structure given by the following structural formula:

For example, for a copolymerization reaction, a radical polymerization catalyst such as an organic peroxide or an azo compound can be used, and for an esterification reaction, a reaction catalyst such as a tertiary amine, an amine salt, a quarternary ammonium salt, or a metal salt can be used to promote the reaction.

The molecular weight of the above-described branch-unsaturated polymer should be at least 5000 and is preferably at least 10,000 and at most 100,000. A substance having a molecular weight of less than 5000 does not always have adequate curability and physical properties, while if the molecular weight exceeds 100,000, the viscosity is too high and workability is poor.

The molar fraction of the (meth)acryloyl groups in the branch-unsaturated polymer is preferably from at least 1% to at most 30%. The most suitable range is from at least 5% to at most 20%.

COMPONENT B

This component is an unsaturated alkyd which is obtained by the esterification of a polyvalent alcohol component and an α-β unsaturated polybasic acid or an anhydride thereof, with or without another polybasic. The polyvalent alcohol component comprises a phenol-modified epoxy resin which is obtained by the reaction of an epoxy group of an epoxy resin and a phenolic hydroxyl group of a phenol, or the reaction product of a polyvalent phenol compound and a monoepoxide.

The unsaturated alkyd (B) imparts stickiness to the polymer (A) having a (meth)acryloyl group in a side chain, and itself is copolymerized with the polymerizable monomer (C) and acts as a crosslinking resin component.

Examples of an epoxy resin which can be used in the manufacture of a phenol-modified epoxy resin are bisphenol A digylicdyl ether types, novolak polyglycidyl ether types, and socalled acetic peracid types in which intramolecular double bonds are oxidized. Market products corresponding to each of these substances are available and are suitable for use in the present invention. Among these substances, a bisphenol A diglycidyl ether type having a comparatively low molecular weight is most suitable from the standpoints of cost and physical properties.

An example of a phenol which can be used in the manufacture of the phenol-modified epoxy resin is a monovalent phenol compound such as phenol, cresol, xylenol, para-substituted alkylphenol, para-phenylphenol, para-cumyl phenol, $\alpha$-naphthol, and $\beta$-naphthol.

The ratio of the epoxy groups and phenolic hydroxyl groups during reaction is substantially at least 0.5 and at most 1 equivalent weight of hydroxyl groups per each equivalent weight of epoxy groups. The reaction between the epoxy resin and the phenol is carried out in the presence of a reaction catalyst such as a tertiary amine, or a quaternary ammonium salt in the vicinity of 150° C.

The reaction between a polyvalent phenol compound and a monoepoxide is carried out with substantially equivalent moles of phenolic hydroxyl groups and epxoy groups in the manner described above. As the polyvalent phenol compound, bisphenol A and novolak (low molecular weight) are most useful, and as the monoepoxide, ethylene oxide, propylene oxide, butylene oxide, and phenyl glycidyl ether are most useful.

Some examples of an $\alpha$-$\beta$ unsaturated polybasic acid or an acid anhydride thereof which can be used for the esterification of the polyvalent alcohol component are maleic anhydride, maleic acid, fumaric acid, and itaconic acid. Phthalic acid, terephthalic acid, isophthalic acid, and other saturated polybasic acids or anhydrides thereof can also be used if necessary. Esterification is carried out under an inert gas stream at a high temperature of 200°-210° C.

The unsaturated alkyd (B) is used in an amount of 10-500 parts by weight, and preferably in an amount of 20-300 parts by weight per 100 parts by weight of Component (A).

COMPONENT C

This component is a polymerizable monomer which dissolves the polymer (A) having a (meth)acrylate group in a side chain and the unsaturated alkyd (B), and it is copolymerized and becomes a crosslinking component. The polymerizable monomer (C) serves to increase the water resistance and adhesion properties of the coating after curing, and by dissolving the polymer (A) and the unsaturated alkyd (B), which are solids, it makes them easier to handle and simplifies the process of molding and curing.

Some examples of a polymerizable monomer (C) which can be employed in the present invention are as follows.

(i) Methacrylates such as methyl methacrylate, ethyl methacrylate, isobutyl methacrylate, t-butyl methacrylate, butyl methacrylate, cyclohexyl methacrylate, tetrahydrofurfuryl methacrylate, benzyl methacrylate, and trimethylolpropane methacrylate.

(ii) Acrylates such as methyl acrylate, ethyl acrylate, butyl acrylate, butanediol diacrylate, and hexanediol diacrylate (iii) Vinyl esters such as vinyl acetate and vinyl proprionate.

(iv) Aromatic vinyls such as styrene and vinyltoluene.

The above monomers can of course be used alone or in combination. The polymerizable monomer (C) is blended with the polymer (A) and the unsaturated alkyd (B). It is desirable that it be blended as a solvent at the time of manufacture of the polymer (A) or the unsaturated alkyd (B). The most suitable monomers (C) are methyl methacrylate and styrene.

The amount of the polymerizable monomer (C) which is employed must be at least enough to dissolve the polymer (A) and the unsaturated alkyd (B). The amount differs depending upon the monomer, but usually a suitable amount is 0.3-3 times the total weight of the polymer (A) and the unsaturated alkyd (B).

COMPONENT D

This component is a peroxide which is used as a curing agent. If a curing agent is not employed, the final curing requires a long time, and the utility of the composition is greatly decreased.

Examples of a peroxide which is suitable as a curing agent are organic peroxides including ketone peroxides such as methyl ethyl ketone peroxide, cyclohexanone peroxide, acetylacetone peroxides, and ethyl acetoacetate peroxide; acyl peroxides such as lauroyl peroxide and benzoyl peroxde; hydroperoxides such as cumene hydroperoxide and t-buyl hydroperoxide; and peroxy esters such as t-butyl peroxy benzoate.

The amount of the peroxide which is employed is 0.5-10 parts by weight and preferably 1-5 parts by weight per 100 parts by weight of the total of the polymer (A), the unsaturated alkyd (B), and the polymerizable monomer (C). If the amount of the peroxide is less than 0.5 parts by weight, the curability at room temperature is inadequate, while if it exceeds 10 parts by weight, no improvement in curability is obtained, material costs increase, and the physical properties of the cured material may deteriorate.

In order to promote curing by the peroxide, it is desirable to employ a curing promoter together with the peroxide. Some examples of a curing promoter which can be used are an organic salt of cobalt, an acetylacetonate of vanadium, and dimethylaniline.

The amount of the curing promoter is 0.01-10 parts by weight and preferably 0.1-5 parts by weight per 100 parts by weight of the total of components A-D.

A curable resin composition in accordance with the present invention is prepared by uniformly mixing the polymer (A), the unsaturated alkyd (B), the polymerizable monomer (C), the peroxide curing agent (D), and if necessary a curing promoter. Furthermore, if necessary, a filler, a reinforcing agent, a coloring agent, a radical polymerizable resin such as an unsaturated polyester resin or a vinyl ester resin, or other additives may also be blended in. In particular, a filler provides the advantages that it makes it easier to apply the present composition on an underwater surface, and it can prevent the formation of an oil film. Any filler which is used in normal resin compositions can be employed. Some examples of suitable substances are talc, calcium carbonate, glass flakes, and Portland cement.

Next, the present invention will be described in greater detail by means of the following examples.

EXAMPLE 1

Component A: synthesis of a polymer (M) having a (meth)acryloyl group in a side chain 728 g of styrene and 3 g of t-butyl dodecyl mercaptan were placed in a 2-liter separable flask equipped with a stirrer, a reflux condenser, a gas inlet pipe having a thermometer, and a dropping funnel. Under a nitrogen gas stream at a temperature of 100° C., dropping of a mixture of 284 g of isobutyl methacrylate, 98 g of maleic anhydride, and 5 g of n-dodecyl mercaptan was performed.

After the start of dropping, the temperature rose to 120° C. At this temperature, dropping was performed over a period of 4 hours. After the completion of dropping, heating was continued at the same temperature for 1 hour, and the solid content rose to 45%, so the temperature was lowered to 100° C., and 0.2 g of hydroquinone, 130 g of 2-hydroxy ethyl methacrylate, and 2 g of para-toluenesulfonic acid were added. Reaction was carried out at the same temperature for 6 hours, and it was determined by infrared spectroscopic analysis that the absorption of the acid anhydride in the polymer was approximately 70% extinguished.

In this manner, a polymer (M) having a (meth)acryloyl group in a side chain was obtained which had a viscosity of 9.1 poise and a value of 350 on the Hazen color scale.

Component B: synthesis of an unsaturated alkyd (N)

370 g of an epoxy resin in the form of Epikote 827 (manufactured by Yuka Shell Epoxy K.K.), 195 g of para-cresol (ratio of epoxy groups to phenolic hydroxyl groups=1:0.9), and 1.5 g of benzyldimethylamine were placed into a 1-liter four-mouth flask equipped with a stirrer, a fractionation condenser, a gas inlet pipe, and a thermometer and were reacted at 150°–160° C. for 5 hours. It was confirmed by infrared spectroscopic analysis that free epoxy groups were completely eliminated.

Next, 110 g of fumaric acid were added, and heating was performed at 200°–210° C. for 6 hours under an inert gas stream, as a result of which the acid value became 19.6. 0.13 g of hydroquinone were added, and the reaction mixture was poured into a metal vat and hardened.

A yellowish brown unsaturated alkyd (N) having a melting point of approximately 110°–115° C. was obtained. Its average molecular weight was 3200.

Curable Resin Composition

A putty-like resin composition which could be cured underwater was prepared from the following components.

Polymer (M): 50 parts by weight
Unsaturated alkyd (N): 30 parts by weight
Styrene: 20 parts by weight
Talc: 75 parts by weight
Benzoyl peroxide: 2 parts by weight
Dimethylaniline: 0.2 parts by weight Coating Test:

The loose rust on the surface of a rusty steel plate was removed using a wire brush, and then the above resin composition was coated on the plate underwater using a rubber spatula. The plate was left underwater for 3 days and then removed. The bond strength of the coating was measured using an Elcometer (an adhesion tester manufactured by Elcometer Instruments, Ltd., England). At a stress of 22–28 kg/square cm, the film of rust came loose from the plate but there was no peeling of the resin coating.

EXAMPLE 2

Component A: synthesis of a polymer (P) having a (meth)acryloyl group in a side chain (Manufacture of a styrene-gylcidyl methacrylate copolymer)

A mixture of styrene (76 weight %), glycidyl methacrylate (23 weight %), and n-dodecyl mercaptan (1 weight %) was supplied at a rate of 1.7 g per minute to a stainless steel reactor (inner diameter: 4 mm, length: 1.5 m) equipped with a pressure regulator, a pressure gauge, and a safety valve, and reaction was carried out at 200° C. under a pressure of 5–7 kg/square cm. As a result, the degree of conversion of styrene was 58%, that of glycidyl methacrylate was 73%, and a clear, colorless, viscous copolymer composition was obtained.

(Introduction of a (meth)acryloyl group into a side chain)

The above-described copolymer composition (22 g), styrene (200 g), methacrylic acid (27.9 g=0.32 moles), and hydroquinone (0.2 g) were placed into a 1-liter separable flask equipped with a stirrer, a thermometer, and a reflux condenser. Reaction was carried out at 100° C. for 5 hours. As a result, the degree of conversion of methacrylic acid was 95%. A resin solution of the polymer (P) which was formed had a transparent straw color and a viscosity of 15 poise at 25° C.

Component B: synthesis of an unsaturated alkyd (Q)

350 g of Epikote 807 (manufactured by Yuka Shell Epoxy K.K.) as a bisphenol F epoxy resin and 179 g of phenol (ratio of epoxy groups to phenolic hydroxyl groups=1:0.95) were uniformly mixed at 50° C. in a 1-liter separable flask equipped with a stirrer, a fractionation condenser, a thermometer, and a gas inlet pipe, after which 0.5 g of trimethylbenzyl ammonium chloride were added, and reaction was carried out at 155°–160° C. for 3 hours. Using infrared spectroscopic analysis, it was determined that the absorption of epoxy groups was completely eliminated.

Next, 90 g of maleic anhydride were added, esterification was performed at 200°–210° C. under an inert gas stream, and after 5 hours the acid value became 21.4. 0.1 g of hydroquinone were added, and the reaction mixture was poured into a metal vat and cooled. An unsaturated alkyd (Q) having a melting point of approximately 100° C. and an average molecular weight of approximately 2600 was obtained.

Curable resin composition and coating test:

The unsaturated alkyd (Q) was ground and dissolved in an equal weight of styrene by heating at 60°–70° C. The solution was then cooled to room temperature. 50 parts by weight of the resulting unsaturated polyester resin were mixed with 50 parts by weight of the polymer (P). 1 part by weight of cobalt naphthenate and 3 parts by weight of cumene hydroperoxide were added. A piece of concrete which had been left in a water bath for 10 days was withdrawn from the bath, and while still wet, one surface was immediately coated with the resin composition.

The composition cured after 2 days at room temperature to form a coating with good adhesion properties.

An attempt was then made to peel off the coating using a thin stainless-steel plate. For over substantially the entire surface, the concrete peeled off with the coating still adhering thereto.

EXAMPLE 3

Component A: Synthesis of a polymer (R) having a (meth)acryloyl group in a side chain
(Manufacture of a styrene-methacrylic acid copolymer)

35 g (0.41 moles) of methacrylic acid, 800 g (7.7 moles) of styrene monomer, 400 g of methyl ethyl ketone, 5.0 g of azobisisobutyronitrile, and 12 g of dodecyl mercaptan were placed in a 3-liter separable flask equipped with a stirrer, a gas inlet pipe having a thermometer, a reflux condenser, and a dropping funnel, and polymerization was performed under a nitrogen gas atmosphere at 75°-80° C. for 10 hours. At the end of this time, 0.5 g of hydroquinone were added to inhibit polymerization.

The rate of polymerization of the styrene monomer was 76%, and that of the methacrylic acid was 93%. A copolymer (a) having an average molecular weight of approximately 50,000 was obtained.
(Introduction of a (meth)acryloyl group in a side chain)

360 g (2 equivalent weights) of Epikote 827 as an epoxy resin, 138 g (1.6 equivalent weights) of methacrylic acid, 1.2 g of benzyldimethylamine, and 0.12 g of para-benzoquinone were placed into a 3-liter separable flask equipped with a stirrer, a gas inlet pipe having a thermometer, a reflux condenser, and a dropping funnel. Reaction was performed at 120°-130° C. under a nitrogen gas atmosphere for 3 hours. The acid value reached nearly zero, and a syrupy, light reddish brown unsaturated epoxy resin (b) was obtained.

It was calculated that this resin (b) was a mixture of 170 g of the compound of Formula V, 325 g of the vinyl ester resin of Formula VI, and 3 g of the epoxy resin of Formula VII which was used as a raw material.

g of styrene monomer, and evaporation was halted when the concentration of methyl ethyl ketone in the distillate was 0.1% or less.

The resulting polymer (R) having a (meth)acryloyl group in a side chain was a yellowish brown liquid having a nonvolatile content of 52 weight % and a viscosity of 6.2 poise at 25° C.

Component B: Synthesis of an unsaturated alkyd 380 g of an adduct of bisphenol A and propylene oxide (obtained by reacting one molecule of bisphenol A with each molecule of propylene oxide) and 116 g of fumaric acid were placed into a 1-liter separable flask equipped with a stirrer, a fractionation condenser, a gas inlet pipe, and a thermometer. Esterification was performed at 180°-210° C. under a nitrogen gas stream, and the reaction was stopped when the acid value reached 37.1. 0.1 g of hydroquinone were added, and the mixture was poured into a metal vat and hardened.

The resulting unsaturated alkyd was a yellowish brown resin with a melting point of approximately 80° C.

Curable resin composition

A curable resin composition was prepared from the following components.

Polymer (R)—60 parts by weight
Unsaturated alkyd (S)—20 parts by weight
Styrene—20 parts by weight
Calcium carbonate—150 parts by weight
Methyl ethyl ketone peroxide—1 part by weight
Cobalt naphthenate—0.5 parts by weight Coating Test This resin composition was applied underwater as a putty to the surface of a steel plate (150 mm × 25 mm × 3 mm) on a 12 mm long section on the end thereof to a thickness of approximately 3 mm. A 12 mm section on the end of another steel plate of the same size was bonded to the first plate by the resin, and the two plates were kept under pressure underwater to cure the resin

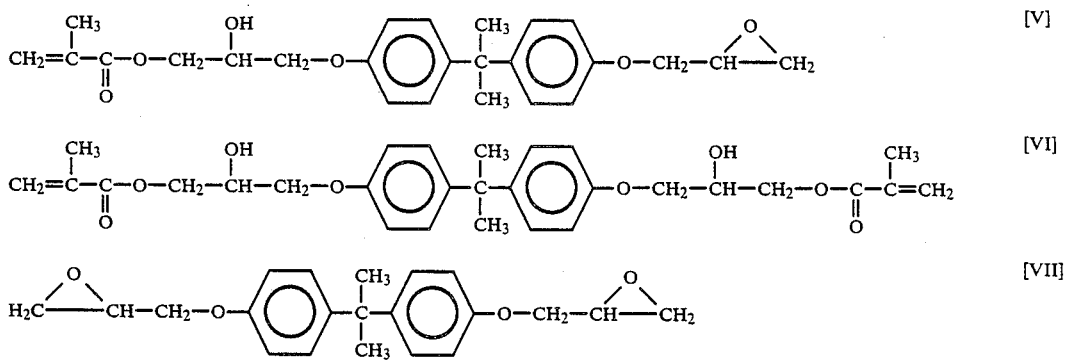

The entire amount of the solution of the styrene-methacrylic acid copolymer (a) was mixed into the unsaturated epoxy resin liquid (b). 5 g of triphenylphosphine and 0.10 g of para-benzoquinone were added, heating was performed, and methyl ethyl ketone solvent was distilled off until the boiling point reached 110° C. Reaction was then carried out at this temperature for 5 hours.

Using liquid chromatography, it was determined that the ratio of the compound of Formula V to the compound of Formula VI changed from 1 before the reaction to approximately 0.15 at the completion thereof.

Evaporation by heating was continued under a pressure of 30-50 mm Hg while intermittently adding 1000 and form a test piece. The plates were left in water for 3 days. Upon removal from the water, the tensile shear strength of the test piece was measured and found to be 73-95 kg/square cm.

EXAMPLE 4

Component A: Synthesis of a polymer (T) having a (meth)acryloyl group in a side chain
(Copolymerization of butyl acrylate and hydroxypropyl methacrylate)

300 g of 1,1,1-trichloroethane, 0.9 g of azobisisophthalonitrile, and 3 g of n-dodecyl mercaptan were placed into a 1-liter separable flask equipped with a stirrer, a reflux condenser, a dropping apparatus, a thermometer, and a gas inlet pipe. While stirring at 80° C., under a nitrogen gas stream, dropping of a 300 g liquid mixture of 90 mole % of butyl acrylate and 10 mole % of 2-hydroxypropyl methacrylate was performed, and reaction was carried out for 3 hours. The conversion rate of butyl acrylate was 96%.

The reflux condenser was replaced by a fractionation condenser. After most of the 1,1,1-trichloroethane was distilled off, 200 g of methyl methacrylate and 0.12 g of para-benzoquinone were added, and under a further reduced pressure, the remaining trichloroethane was distilled off, after which 47 g of methyl methacrylate were added to make up for the lost portion thereof.
(Introduction of a (meth)acryloyl group into a side chain)

450 g of the methyl methacrylate solution which was prepared in the previous step, 20 g of isocyanate ethyl methacrylate, and 1 g of dibutyltin laurate were placed into a 1-liter separable flask equipped with a stirrer, a thermometer, a reflux condenser, and a gas inlet pipe, and while dry air was blown into it, reaction was carried out at 60° C. for 4 hours. By infrared spectroscopic analysis, it was determined that the isocyanate groups were completely consumed.

Component B: synthesis of an unsaturated alkyd (U)

360 g of DEN-431 (manufactured by Asahi-Dow) as an epoxy resin, 170 g of phenol (0.9 equivalent weights of hydroxyl groups per 1 equivalent weight of epoxy groups), and 1.5 g of benzyldimethylamine were placed into a 1-liter separable flask equipped with a stirrer, a fractionation condenser, a thermometer, and a gas inlet pipe, and the mixture was heated at 150°-160° C. for 3 hours. The product was analyzed by infrared spectroscopic analysis, and it was confirmed that free epoxy groups had completely vanished.

Next, 116 g of fumaric acid (1 equivalent weight of carboxyl groups for each equivalent weight of epoxy groups) were added, and esterification was carried out at 200°-210° C. under a nitrogen gas stream. After approximately 5 hours, the acid value reached 9.4, so 0.05 g of hydroquinone were added and the reaction mixture was poured into a metal vat.

The resulting unsaturated alkyd (U) was yellowish brown and had a melting point of approximately 100° C.
Curable Composition Using the following components, a putty-like resin composition which was curable in water was obtained.
Polymer (T)—70 parts by weight
Unsaturated alkyd (U)—20 parts by weight
Methyl methacrylate—10 parts by weight
Talc—75 parts by weight
Benzoyl peroxide—1 part by weight
Dimethylaniline—0.3 parts by weight
Coating Test The above composition was coated on an iron plate in a water bath using a rubber spatula, and the plate was left underwater for 3 days. The plate was then removed form the water bath, and the bond strength of the coating was measured using an Elcometer. It was found to be 40-60 kg/square cm, which is an adequate level for practical purposes.

From the results of test performed on the above-described examples, it can be seen that a curable resin composition in accordance with the present invention can form a coating which can cure underwater and which has excellent adhesion properties even when applied to a wet or damp surface as well as excellent resistance to water and chemicals. It can therefore be advantageously employed as a coating compound or a bonding agent. It is particularly suitable for the lining of large underwater surfaces and for casting, and therefore it can be utilized for protective linings of underwater surfaces of marine structures, for the repair of drainage pits, and for similar uses.

What is claimed is:

1. A curable resin composition comprising:
(A) a polymer having a (meth)acryloyl group in a side chain obtained by reacting a copolymer (a) of a first polymerizable monomer (i) which has a carbon-carbon double bond and a second polymerizable monomer (ii) which has a polymerizable double bond which can bond with said first polymerizable monomer (i) and a (meth)acryloyl group-receptive functional group, and a compound (b) which has a group which can react with said (meth)acryloyl group-receptive functional group and a (meth)acryloyl group;
(B) an unsaturated alkyd which is formed by the esterification by a polyvalent alcohol component and an α-β unsaturated polybasic acid or an anhydride thereof with or without another polybasic acid, said polyvalent alcohol component comprising a phenol-modified epoxy resin which is obtained by the reaction of an epoxy group of an epoxy resin and a phenolic hydroxyl group of a phenol, or a reaction product of a polyvalent phenol compounde and a monoepoxide;
(C) a polymerizable monomer; and
(D) a curing agent.

2. A curable resin composition as claimed in claim 1, wherein said first polymerizable monomer (i) is at least one substance selected from styrene, vinyltoluene, chlorostyrene, acrylates, methacrylates, acrylonitrile, vinyl chloride, vinylidene chloride, vinylpyrrolidone, and vinyl acetate, and said polymerizable monomer (ii) is a compound containing an acid anhydride group, a carboxyl group, a hydroxyl group, or an epoxy group.

3. A curable resi composition as claimed in claim 1, wherein said copolymer (a) has an acid anhydride group in a side chain, and said compound (b) is an unsaturated monoalcohol having a (meth)acrylolyl group.

4. A curable resin composition as claimed in claim 1, wherein said copolymer (a) has a carboxyl group in a side chain, and said compound (b) is an unsaturated monepoxide having a (meth)acryloyl group.

5. A curable resin composition as claimed in claim 1, wherein said copolymer (a) has a hydroxyl group in a side chain, and said compound (b) is an unsaturated isocyanate.

6. A curable resin composition as claimed in claim 1, wherein said copolymer (a) has an epoxy group in a side chain, and said compound (b) is (meth)acrylic acid.

7. A curable resin composition as claimed in any one of claims 1 or 2-6, wherein said modified epoxy resin of component B is an epoxy resin selected from bisphenol A diglycidyl ether and novolak polyglycidyl ether which is modified by a phenol selected from phenol, cresol, xylenol, para-alkylphenol, paraphenyphenol, para-cumyl phenol, α-naphthol, and β-naphtal.

8. A curable resin composition as claimed in any one of claims 1 or 2-6, further comprising one or more filler selected from talc, calcium carbonate, glass flakes, and Portland cement.

* * * * *